July 21, 1970     D. E. ROACH     3,521,024
WELDING GUN
Filed June 9, 1967
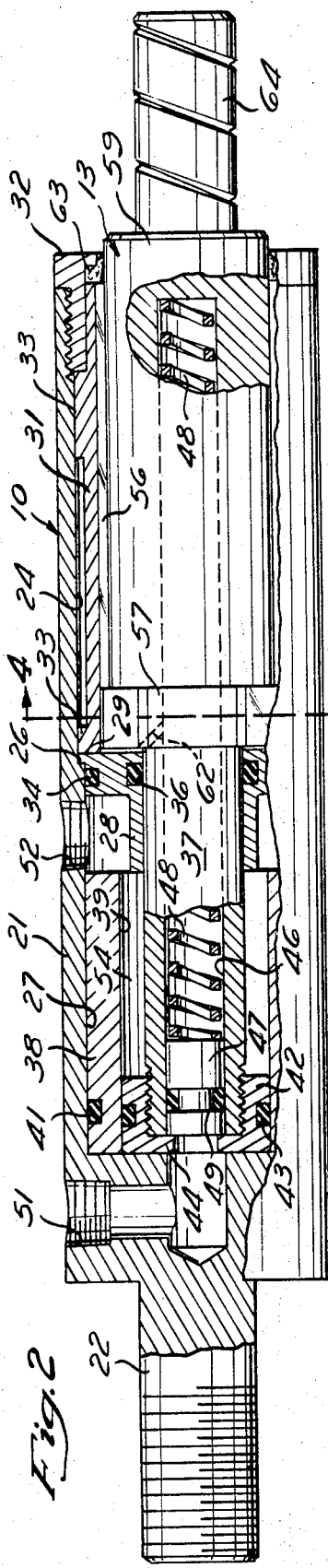
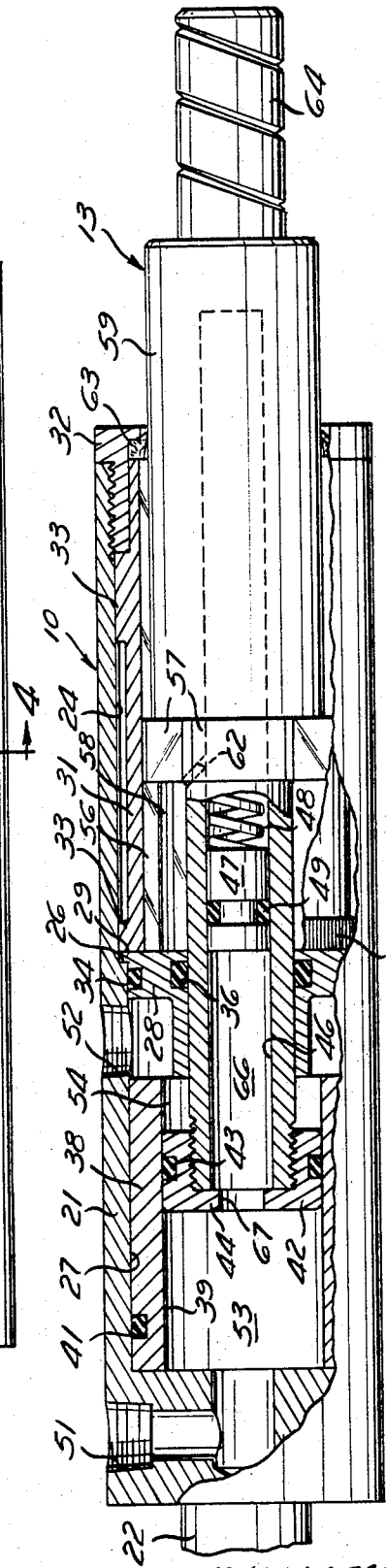
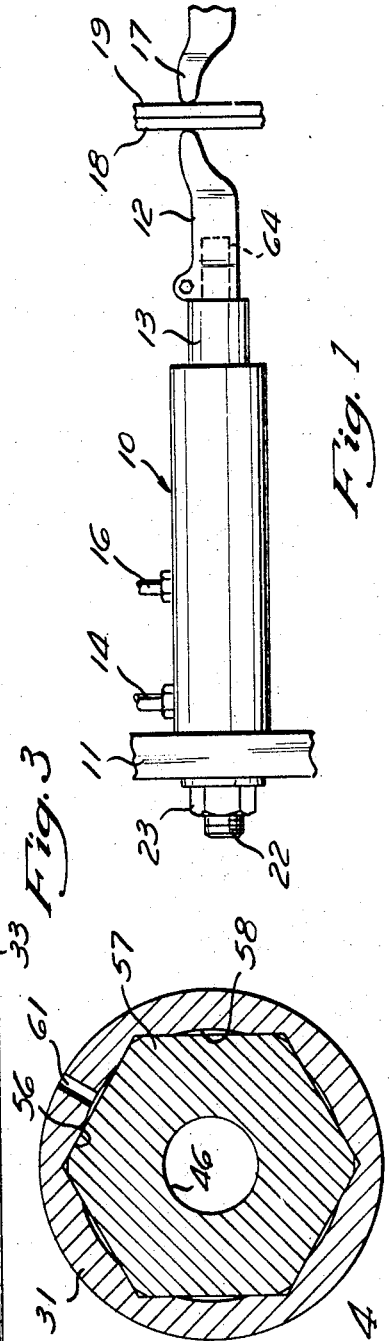
INVENTOR.
DONALD E. ROACH
BY
McNENNY, FARRINGTON, PEARNE & GORDON
ATTORNEYS United States Patent Office 3,521,024
Patented July 21, 1970

3,521,024
WELDING GUN
Donald E. Roach, Port Huron, Mich., assignor, by mesne assignments, to Scovill Manufacturing Company, Waterbury, Conn., a corporation of Connecticut
Filed June 9, 1967, Ser. No. 644,927
Int. Cl. B23k 11/10
U.S. Cl. 219—89        13 Claims

ABSTRACT OF THE DISCLOSURE

A hydraulic welding electrode actuator provided with a hydraulic accumulator within the actuator piston. The accumulator provides substantially instantaneous "follow-up" extension of the actuator when the material of the workpieces being welded softens and starts to flow. A relatively long, low rate, compression spring is provided in the accumulator so that relatively long follow-up stroke is provided at a relatively constant force level. A guide sleeve, mounted in the cylinder, is provided with curved, axially extending, peripherally spaced bearing surfaces to laterally support the piston. Intermediate recesses in the sleeve between the curved bearing surfaces receive mating projections on the piston to prevent relative rotation between the piston and cylinder while permitting axial motion therebetween.

FIELD OF INVENTION

This invention relates generally to welding devices and more particularly to a novel and improved electric welding device including hydraulic actuation means for pressing a welding electrode against a workpiece, wherein the actuation means is arranged to provide rapid "follow-up" as the workpiece softens.

BACKGROUND OF INVENTION

In many types of welding it is important to apply pressure to the workpiece being welded. For example, when spot welding two workpieces it is normal to press electrodes against opposite sides of the two workpieces to produce tight conducting engagement between each electrode and its associated workpiece and to press the workpieces together with tight engagement in the weld zone. In many instances a spot welder is provided with a fixed electrode and a moveable electrode carried by a hydraulic actuator which provides this force. Systems of this type are often arranged to provide a follow-up to maintain the electrode pressure as the workpiece material softens and starts to flow.

PRIOR ART

In the past it has been determined that the follow-up, automatically provided when a hydraulic actuator remains connected to the source of hydraulic pressure, does not, in many instances, provide sufficiently rapid response to insure the production of uniformly high-quality welds. The rate of follow-up response is slowed by system inertia, including the inertia of the liquid in the system between the pump and the actuator, and by line losses. This problem is particularly severe in fixture type installations where large numbers of welding heads are often connected to a single source of fluid under pressure through relatively complex connecting lines.

The problem, related to the rate of follow-up response, is reduced in some prior art welding guns which have been provided with Belleville-type springs through which the force applied to the moveable electrode is transmitted. An example of such welding gun is illustrated in the U.S. Letters Pat. No. 2,944,525, dated July 12, 1960. In such devices the force applied to the moveable electrode deforms the Belleville springs and the springs provide a reservoir of energy available to cause follow-up extension of the actuator when the reaction force on the electrode drops, due to flow of the workpiece material.

Belleville-type springs had been used because relatively small springs of this type can be used to transmit relatively high forces. However, it has been found that such structures have several serious disadvantages. For example, such springs inherently provide a relatively high spring rate and a relatively short stroke. Consequently, the potential follow-up distance is very limited and the force on the electrode drops rapidly as the springs extend. Also, the rate of wear and breakage of such springs is relatively high.

SUMMARY OF INVENTION

A welding gun incorporating the present invention provides rapid follow-up response to maintain the electrode force as the material of the workpiece softens and starts to flow. The follow-up is provided by a hydraulic-type accumulator located within the electrode actuator itself, so the response is virtually instantaneous.

The accumulator includes a relatively long stroke spring having a relatively low spring rate when compared to Belleville-type springs. The long stroke permits the storage of more energy, so the available follow-up distance is increased, and the relatively low spring rate of the spring results in follow-up wherein the electrode force is maintained at a relatively constant value. The accumulator spring is a simple coil spring loaded in compression. Such springs provide reliable service for indefinite periods of time without appreciable wear and with a minimum of breakage.

In the illustrated embodiment the accumulator is located within the piston rod of the actuator and does not require any appreciable increase in the total size of the actuator. In fact, the actuator structure is, in certain respects, simpler than the structure of the prior art actuators of the type described above, so the manufacturing and general servicing costs are usually lower than in such prior art devices. The illustrated embodiment also provides a novel and improved guide structure to prevent relative rotation between the piston and cylinder members.

OBJECTS OF INVENTION

It is an important object of this invention to provide a novel and improved electric welding gun provided with hydraulic actuating means to urge the associated electrode against the workpiece to be welded including simplified and improved means for providing follow-up to maintain a substantially constant force on the electrode as the weld is formed.

It is another important object of this invention to provide a novel and improved piston and cylinder type actuator for welding devices, incorporating an internal hydraulic accumulator operable to maintain the output force of the actuator at a relatively constant value through a relatively long follow-up stroke.

Further objects and advantages will appear from the following description and drawings wherein:

FIG. 1 is a fragmentary side elevation illustrating a typical installation of a welding device incorporating this invention wherein the actuator operates to press a moveable spot welding electrode against workpieces to be welded;

FIG. 2 is an enlarged side elevation, partially in longitudinal section, illustrating the structural detail of one preferred form of actuating device incorporating this invention showing the elements in their retracted position before extending pressure is supplied to the device;

FIG. 3 is a side elevation similar to FIG. 2 illustrating the elements in the position they assume when extending pressure is supplied to the actuator; and FIG. 4 is an enlarged fragmentary cross-section, taken generally along 4—4 of FIG. 2, with the outer cylinder and the accumulator spring removed for purposes of illustration.

In a typical installation the actuator assembly 10 is mounted on a supporting frame 11 and a moveable welding electrode 12 is mounted on the actuator piston rod 13. Hydraulic fluid under pressure is selectively supplied to the actuator through pressure lines 14 and 16 to control the extension and retraction of the actuator. The control system for the hydraulic fluid under pressure is not illustrated, but would include suitable four-way valves and pressure control means of the type well known to persons skilled in the art.

When pressure is supplied to the pressure line 14 the piston rod 13 extends and moves the moveable electrode 12 toward a stationary electrode 17 (supported by suitable frame members not illustrated) causing the two electrodes to press against opposite sides of the two workpieces 18 and 19 which are to be welded. After the workpieces are properly engaged and clamped by the electrodes, current is applied across the electrodes in the usual manner. When the workpiece material softens the follow-up operates automatically and rapidly to cause additional extension of the piston rod 13 so that the electrode pressure against the workpiece is maintained until the weld is completed.

Referring now to FIGS. 2 through 4, the actuator assembly 10 includes a cylinder body 21 which may be formed with a threaded mounting stud 22 at one end. When the cylinder is mounted, as illustrated in FIG. 1, the stud 22 projects through the frame 11 and a nut 23 mounts the cylinder in place. The cylinder is formed with a first bore 24 extending inwardly from the outer end to a shoulder 26 joining the first bore 24 with a second bore 27 of a slightly smaller diameter.

A bulkhead 28 is mounted within the second bore 27 and is provided with a radial flange 29 seated against the shoulder 26 to axially locate the bulkhead. A sleeve 31 engages the side of the bulkhead 28 remote from the shoulder 26 to retain the bulkhead against the shoulder. The sleeve 31 is in turn retained in place by a ring nut 32 threaded into the cylinder 21. The sleeve 31 is in turn retained in place by a ring nut 32 threaded into the cylinder 21. The sleeve is provided with radial flanges 33, the exterior surfaces of which are knurled and sized to provide an interference fit with the first bore 24, so that the sleeve 31 is locked against rotation relative to the cylinder 21.

The bulkhead 28 is provided with an external O-ring type seal 34 which engages the surface of the second bore 27 providing a fluid-tight joint therewith and an inner O-ring type seal 36 which provides a sliding seal with the exterior of the piston rod 13. In the illustrated assembly a sleeve 38 is fitted into the second bore 27 to reduce the effective area of the piston by providing a reduced diameter cylinder bore 39. The particular actuator illustrated is arranged so that the main components can be used interchangeably with units of higher capacity without the requirement for special cylinders for each thrust capacity of the actuator. Consequently, the sleeve 38 is inserted when the thrust capacity of the unit is relatively small and results in a lower effective area for the piston. However, when higher thrust capacities are required thinner sleeves 38, having a larger cylinder bore 39, are assembled in the cylinder and in some instances no sleeve is utilized. The sleeve 38 is provided with an external O-ring type seal 41 which forms a fluid-tight joint with the second bore 27.

Threaded onto the inner end of the piston rod 13 is a piston 42 which closely fits the cylinder bore 39 and which is provided with an O-ring type seal 43 providing a sliding sealing engagement with the cylinder wall 39. The piston 42 is formed with an inwardly extending flange 44 which serves as a stop for a plunger 47 located in an axial accumulator bore 46 formed in the piston rod 13. The accumulator plunger 47 slides along the bore 46 and is resiliently urged to the left, as viewed in FIGS. 2 and 3, toward a position against the flange 44 by a compression spring 48. Here again, an O-ring type seal 49 is mounted on the accumulator plunger 47 to provide a sealing engagement with the bore 46.

The cylinder 21 is provided with a threaded port 51 for connection to the pressure line 14 and a second threaded port 52 for connection to the pressure line 16. When extension of the piston rod 13 is required, hydraulic fluid under pressure is admitted to the extension chamber 53 through the port 51 while the port 52 is connected to the reservoir system. This pressurizes the variable volume extension chamber 53 and causes the piston rod 13 to extend to the right from the retracted position of FIG. 2. Conversely retraction is provided when pressure is supplied through the port 52 to the retraction chamber 54 while the port 51 is connected to the reservoir return.

The piston rod 13 is restrained against rotation relative to the sleeve 31 and the cylinder 21 by a structure best illustrated in FIG. 4. The sleeve 31 is formed with a hexagonal cross section inner opening 56 along which slides a mating hexagonal flange 57 formed on the piston rod 13. Intermediate the corners of the hexagonal opening 56 the sleeve 31 is formed with curved bearing surfaces 58 having a diameter slightly larger than the across-the-flats width of the hexagonal opening. The six symmetrically located bearing surfaces 58 cooperate to form an interrupted bearing cylinder having a diameter proportioned to closely fit the outer surface of a cylindrical portion 59 of the piston rod 13. With this arrangement the sleeve 31 serves both as a lateral bearing for the forward end of the piston rod 13 and as a device for preventing rotation of the piston rod 13 in the cylinder.

A vent 61 prevents the entrapment of air which could otherwise affect the thrust of the piston rod 13. Similarly, the bore 46 is vented by a vent 62 at a location along the bore not reached by the accumulator plunger 47. A wiper ring 63 is mounted at the outer end of the cylinder by the ring nut 32 and the end of the piston rod 13 is provided with a mounting extension 64 on which the electrode 12 is mounted.

OPERATION

When the workpieces 18 and 19 are properly positioned for welding the hydraulic controls are operated to supply hydraulic fluid under pressure to the port 51 and the port 52 is connected to reservoir return. This causes the piston rod 13 to extend, increasing the volume of the chamber 53. When the moveable electrode 12 engages the workpiece 18 it is tightly clamped against the workpiece 19 which is in turn clamped against the fixed electrode 17 with a force determined by the supply pressure and the area of the piston.

As soon as the piston rod 13 encounters resistance to further extension the pressure in the chamber 53 starts to buildup. This causes the accumulator plunger 47 to move to the right against the action of the spring 48 as illustrated in FIG. 3. The spring 48 is sized so that the accumulator piston 47 reaches a position approximately as shown in FIG. 3 when the pressure in the main chamber 53 and in the accumulator chamber 66 reaches the supply pressure on the actuator. It should be noted that the effective area of the piston is equal to the area of the cylinder bore 39 since the force on the accumulator plunger 47 is transmitted through the spring 48 to the piston rod 13 at the inner end of the accumulator bore 46. Therefore, the rating of the unit is not adversely affected by the presence of the accumulator within the piston.

When equilibrium is reached indicating that the required force is supplied by the actuator the welding current is turned on. As soon as the workpieces 18 and 19 reach a temperature at which they soften the workpiece material starts to flow. The flow of the workpiece material tends to reduce the reaction force on the piston rod 13, so the pressure in the chamber 53 drops slightly. When this occurs the spring 48 extends and moves the accumulator plunger 47 toward its extended position, causing liquid within the accumulator chamber 66 to flow into the main chamber 53. This results in follow-up extension of the piston.

This follow-up extension is substantially instantaneous since the accumulator chamber 66 is immediately adjacent to the main chamber 53 and there is little inertia to overcome before follow-up extension occurs. The aperture 67 in the flange 44 is relatively large so that there will be substantially no restriction to the flow of the liquid into the chamber 53. Even during follow-up extension the effective area of the piston remains the same since the pressure in the chamber 53 remains substantially equal to the pressure within the accumulator chamber 66 differing therefrom only by the very slightly differential pressure required to cause flow into the main chamber. Consequently, the force produced by the actuator during follow-up drops only by an amount determined by the spring rate of the spring 48.

In the illustrated embodiment of this invention the drop in force during follow-up operation is minimized by using a relatively long spring 48 having a relatively low spring rate when compared to Belleville-type springs of the prior art. In this embodiment the extended length of the spring 48 is substantially longer than the piston stroke. This length is possible since the accumulator bore extends into the cylindrical portion 59. Therefore, substantial displacement of the accumulator plunger 47 occurs without drastic changes in the force of the spring and in turn the resulting pressure of follow-up actuation. After the weld is completed the hydraulic connections to the ports 51 and 52 are reversed and the actuator retracts to its initial position of FIG. 2.

By locating the follow-up accumulator within the piston itself the overall size of the actutor remains substantially the same as would be required without follow-up. Further, the manufacturing costs are substantially reduced due to structure utilizing a single-piece piston rod and a simple compression spring instead of a more costly two-piece piston and Belleville springs.

Although a preferred embodiment of this invention is illustrated it is to be understood that various modifications and rearrangements of parts may be resorted to without departing from the scope of the invention disclosed.

I claim:

1. A welding device comprising an actuator including telescoping piston and cylinder means, said actuator being adapted to press a welding electrode against a workpiece when supplied with hydraulic fluid under pressure, and hydraulic accumulator means in said actuator, said accumulator means including a moveable pressure responsive element and spring means operable to resiliently urge said element in one direction, hydraulic fluid under pressure supplied to said actuator causing said element to move against said spring means providing an accumulated volume of such fluid under pressure within said actuator, said accumulator means operating to deliver accumulated fluid to extend said actuator when the force produced by said actuator decreases.

2. A welding device as set forth in claim 1 wherein said piston and cylinder members cooperate to define a variable volume chamber to which said hydraulic fluid under pressure is supplied when an electrode is to be pressed against a workpiece, and said accumulator means is open directly to said chamber.

3. A welding device as set forth in claim 1 wherein said members cooperate to define a first variable volume chamber to which said hydraulic fluid under pressure is supplied when said actuator is operated to press an electrode against a workpiece, one of said members being provided with an axial passage having one end in communication with said chamber, said pressure responsive element being a plunger slideable along said axial passage, and said spring means is a mechanical compression spring in said axial passage on the side of said plunger opposite said one end, said mechanical spring operating to urge said plunger toward said one end.

4. A welding device as set forth in claim 3 wherein said axial passage is formed in said piston member and said one end of said axial passage is open directly to said chamber.

5. A welding device as set forth in claim 4 wherein said piston member is moveable relative to said cylinder member through a stroke of a predetermined length from a retracted position to an extended position, said axial passage has a length greater than said stroke, and said spring has a length greater than the length of said stroke when said first chamber is unpressurized.

6. A welding device as set forth in claim 5 wherein pressure in said first chamber produces a force urging said piston relative to said cylinder towards an extended position, and said piston and cylinder members cooperate to define a second chamber adapted to be supplied with fluid under pressure to move said piston member relative to said cylinder member to said retracted position.

7. A welding device as set forth in claim 6 wherein said piston and cylinder members are provided with guide means to prevent relative rotation therebetween while permitting relative axial motion therebetween.

8. A welding device as set forth in claim 5 wherein said piston and cylinder members are provided with mating guide means, said guide means including a cylindrical portion on said piston member closely fitting a plurality of curved axially extending bearing surfaces on said cylinder member peripherally spaced around said piston member, said cylinder member being formed with axially extending recesses between each bearing surface, and said piston member being formed with a radial projection extending into and slideable along each recess to prevent relative rotation between said members while permitting relative axial motion therebetween.

9. A welding device as set forth in claim 8 wherein seal means are provided on said cylinder member slideably engaging said piston member, said chambers being located between said seal means and the inner end of said cylinder, and said guide means being located between said seal means and the outer end of said cylinder.

10. A welding device as set forth in claim 9 wherein said axial passage extends into said cylindrical portion of said piston member.

11. A welding device as set forth in claim 10 wherein an electrode is mounted on said piston member and said cylinder member is adapted to be supported by a frame.

12. A welding device comprising a double acting actuator including telescopini piston and cylinder members, said members cooperating to define variable volume extension and retraction chambers adapted to receive fluid under pressure, fluid under pressure in said extension chamber urging said piston member relative to said cylinder member toward an extended position and fluid under pressure in said retraction chamber urging said piston member relative to said cylinder member toward a retracted position, seal means on said cylinder member providing a sliding seal with said piston member, a circular wiper at the outer end of said cylinder, said piston providing a cylindrical portion movable through said wiper, guide means on said piston and cylinder members between said seal means and said wiper, said guide means including said cylindrical portion on said piston member closely fitting a plurality of curved axially extending bearing surfaces on said cylinder member peripherally spaced around said piston member, said cylinder member being formed with an axially extending recess between each bearing surface, and said piston being formed with a radial projection at one end of said cylindrical portion extending into and slideable along each recess to prevent relative rotation between said members while permitting relative axial motion therebetween.

13. A welding device as set forth in claim 12 wherein said axial recesses cooperate to define a substantially hexagonal opening with said curved bearing surfaces projecting outwardly from the middle of each side of such hexagonal opening.

References Cited

UNITED STATES PATENTS

| | | | |
|---|---|---|---|
| 2,661,599 | 12/1953 | Folmer | 219—89 X |
| 2,839,665 | 6/1958 | Wolfbauer | 219—89 |
| 2,944,525 | 7/1960 | Fagge | 219—89 X |

JOSEPH V. TRUHE, Primary Examiner

M. C. FLIESLER, Assistant Examiner

U.S. Cl. X.R.

92—110